United States Patent
Poterala

(10) Patent No.: US 11,315,709 B2
(45) Date of Patent: Apr. 26, 2022

(54) METAL OXIDE VARISTOR FORMULATION

(71) Applicant: Hubbell Incorporated, Shelton, CT (US)

(72) Inventor: Stephen Franklin Poterala, Aiken, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/123,943

(22) Filed: Dec. 16, 2020

(65) Prior Publication Data
US 2021/0193354 A1 Jun. 24, 2021

Related U.S. Application Data

(60) Provisional application No. 62/951,183, filed on Dec. 20, 2019.

(51) Int. Cl.
*H01C 7/102* (2006.01)
*H01C 7/108* (2006.01)

(52) U.S. Cl.
CPC ............ *H01C 7/108* (2013.01); *H01C 7/102* (2013.01)

(58) Field of Classification Search
CPC ......... H01C 7/102; H01C 7/108; H01C 7/112
See application file for complete search history.

(56) References Cited

U.S. PATENT DOCUMENTS

| | | | |
|---|---|---|---|
| 3,764,566 A | 10/1973 | Matsuoka et al. | |
| 3,806,765 A | 4/1974 | Matsuoka et al. | |
| 4,147,670 A * | 4/1979 | Shohata | H01C 7/112 252/519.52 |
| 4,527,146 A * | 7/1985 | Kanai | H01C 7/112 252/519.52 |
| 4,540,971 A * | 9/1985 | Kanai | H01C 7/112 252/519.5 |
| 5,231,370 A * | 7/1993 | Arnold, Jr. | H01C 7/112 252/519.5 |
| 5,608,596 A * | 3/1997 | Smith | H01C 1/14 361/111 |
| 6,008,975 A * | 12/1999 | Kester | H01C 7/12 361/111 |
| 6,519,129 B1 * | 2/2003 | Ramarge | H01C 7/12 361/117 |
| 2010/0140563 A1 * | 6/2010 | Kasuga | H01C 7/112 252/513 |

FOREIGN PATENT DOCUMENTS

EP    2857374    4/2015

OTHER PUBLICATIONS

PCT/US2020/065317 International Search Report and Written Opinion dated Mar. 19, 2021 (11 pages).

* cited by examiner

*Primary Examiner* — Kyung S Lee
(74) *Attorney, Agent, or Firm* — Michael Best & Friedrich LLP

(57) ABSTRACT

Provided are metal oxide varistors comprising a sintered ceramic, in which the ceramic comprises, by weight, about 91.0% to about 97.0% ZnO, at least 0.3% Mn, at least 0.4% Bi, at least 1.0% Sb, and 0.50% or less Co. The metal oxide varistors as disclosed herein may exhibit reduced power dissipation, improved thermal stability, and may be produced at a lower cost relative to conventional MOV devices.

18 Claims, 1 Drawing Sheet

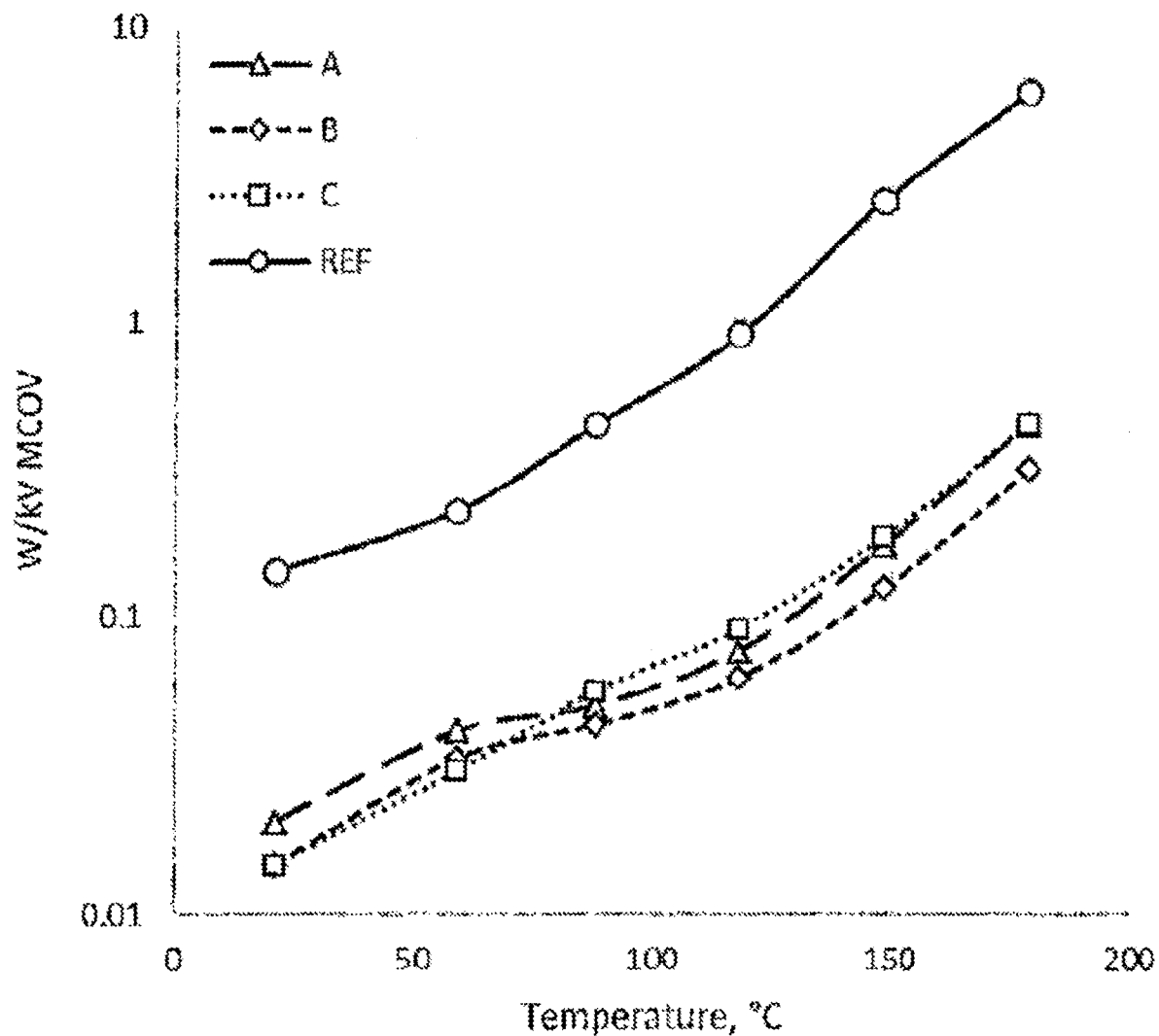

METAL OXIDE VARISTOR FORMULATION

CROSS-REFERENCE TO RELATED APPLICATION

This application claims the benefit of and priority to U.S. Provisional Application No. 62/951,183, filed on Dec. 20, 2019, the content of which is incorporated by reference herein in its entirety, and priority to which is hereby claimed.

FIELD

The present disclosure relates to metal oxide varistors formulations, which may be produced at reduced cost and provide improved thermal stability compared to conventional formulations.

BACKGROUND

Surge protection in both high and low-voltage circuits is typically afforded by surge arresters that utilize one or more metal oxide varistors (MOVs). A MOV acts as a voltage-dependent resistor that reversibly switches between low and high resistivity states over a narrow voltage range. Near the switching voltage, the voltage-current relationship is often characterized using a power law relationship $I=CV^\alpha$ where $\alpha$ is a nonlinearity coefficient and C is constant. The peak value of $\alpha$ may exceed 40-50 in some materials. MOVs are typically rated by the manufacturer for various properties that may include the maximum continuous operating voltage (MCOV), temporary overvoltage (TOV) capability and residual voltage during a specified surge event (e.g., 8×20 μs surge at 10,000 A). Commercially available MOVs for high voltage application are rated for particular levels of duty per guidelines given in the US IEEE C62.11 standard or the international IEC 60099-4 standard.

The nonlinear V-I behavior of the MOV originates from the additive elements. The MOV microstructure consists of n-type semiconductive ZnO grains and resistive grain boundaries. The grain boundaries are compositionally distinct, containing $Bi_2O_3$ as well as other modifying elements such as Mn, Co, and Sb. Interface states located at the grain boundary behave as electron traps, and capture conduction band electrons within the adjacent n-type ZnO. This process results in a double Schottky barrier at the grain boundary that impedes the flow of electrons. Current leakage through the Schottky barrier is thermally activated, and the power dissipation of a MOV in the range of 1.0-1.25*MCOV typically has a strong temperature dependence. If the MOV is overheated by repeated exposure to surge duty, the power dissipation at MCOV may exceed a level that can be dissipated by the arrester housing, causing the arrester to fail by thermal runaway.

Thus, there remain a need for alternative MOV formulations improve thermal stability and nonlinear behavior.

SUMMARY

In one aspect, the present disclosure provides a metal oxide varistor comprising:
  a sintered ceramic comprising, by weight:
    about 91.0% to about 97.0% ZnO;
    at least 0.3% Mn;
    at least 0.4% Bi;
    at least 1.0% Sb; and
    0.50% or less Co.

In another aspect, the present disclosure provides a surge arrester for protecting one or more conductors against a power surge, the surge arrestor comprising a metal oxide varistor as described herein, wherein surge current is diverted from the conductor(s) to ground through the metal oxide varistor.

The metal oxide varistors as described herein exhibit reduced power dissipation, improved thermal stability, and may be produced at a lower cost relative to conventional MOVs.

Other aspects of the application will become apparent by consideration of the detailed description and accompanying drawings.

BRIEF DESCRIPTION OF THE DRAWINGS

FIG. 1 shows W/kV MCOV as a function of temperature for the three MOV formulations provided in Table 1. The reference material ("REF") is a commercially available MOV used in IEEE C62.11-2012 "normal duty" surge arresters.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9 to 1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "metal oxide varistor" (MOV) refers to an oxide ceramic material, or an electrical unit manufactured therefrom, which exhibits a highly nonlinear relationship between voltage and current, such that the electrical resistivity of the material substantially decreases as voltage is increased.

The term "maximum continuous operating voltage" (MCOV) means 80% of a reference voltage measured at a peak current density of 0.4 mA/cm$^2$ (60 Hz) at 20° C. All voltages and currents are defined as peak values for 60 Hz unless otherwise noted. Voltage values may also be alternately expressed in RMS units.

Unless otherwise specified, the chemical elements as disclosed herein (e.g., Mn, Co, Bi, Sb) may be included in a formulation in any suitable molecular form. These include, for example, commercially available oxides, carbonates, hydroxides, nitrates, mixed oxide precursors, and other molecular forms of that element known in the art.

The present disclosure relates to a chemical formulation for manufacturing a MOV, which may be used in high voltage surge arresters such as those governed by IEEE C62.11, IEC 60099-4 or similar standards.

In one aspect, the present disclosure provides a metal oxide varistor comprising:
 a sintered ceramic comprising, by weight:
  about 91.0% to about 97.0% ZnO;
  at least 0.3% Mn;
  at least 0.4% Bi;
  at least 1.0% Sb; and
  0.50% or less Co.

As described herein, the sintered ceramic refers to a sintered formulation that provides a ceramic body for the metal oxide varistor (MOV). It is understood that the present sintered formulations are adapted to the working conditions of the MOV, such as temperature, voltage, and electrical current, in compliance with standards known in the art. The metal oxide varistor may further comprise a first electrode having a first electrode surface and a second electrode having a second electrode surface. For example, the sintered ceramic may be sandwiched between two metal plates, which function as the electrodes of the varistor.

The formulations may comprise at least 91.0%, at least 92.0%, at least 93.0%, at least 94.0%, at least 95.0%, or at least 96.0% by weight of ZnO. The formulations may comprise less than 97.0%, less than 96.0%, less than 95.0%, less than 94.0%, less than 93.0%, or less than 92.0% by weight of ZnO. The formulations may comprise about 92.0% to about 97.0%, about 93.0% to about 97.0%, about 94.0% to about 97.0%, or about 95.0% to about 97.0% by weight of ZnO. In some embodiments, the formulations comprise about 95.0% to about 97.0% by weight of ZnO, such as about 95.5%, about 96.0%, or about 96.5% by weight of ZnO.

The formulations may comprise 0.4% or less, 0.3% or less, 0.2% or less, or 0.1% or less by weight of cobalt (Co). In some embodiments, the formulations comprise 0.20% or less by weight of Co, such as 0.18% or less, 0.15% or less, 0.12% or less, 0.10% or less, 0.09% or less, 0.08% or less, 0.07% or less, 0.06% or less, 0.05% or less, 0.04% or less, 0.03% or less, 0.02% or less, 0.01% or less, 0.005% or less, or 0.001% or less by weight of Co. In some embodiments, the formulations are free of Co.

The Co may be included in the formulations at least partially in the form of a cobalt oxide, such as $Co_3O_4$. For example, the formulations may comprise 0.68% or less by weight of $Co_3O_4$, corresponding to 0.50% or less by weight of Co. In some embodiment, the formulations comprise 0.60% or less by weight of $Co_3O_4$, such as 0.50% or less, 0.40% or less, 0.30% or less, 0.20% or less, 0.10% or less, 0.05% or less, 0.01% or less, 0.005% or less, or 0.001% or less by weight of $Co_3O_4$. In some embodiments, the formulations are free of $Co_3O_4$.

The formulation may comprise at least 0.3% by weight of manganese (Mn), such as at least 0.4%, at least 0.5%, at least 0.6%, at least 0.7%, at least 0.8%, at least 0.9%, or at least 1.0% by weight of Mn. The formulation may comprise less than 1.0%, less than 0.9%, less than 0.8%, less than 0.7%, less than 0.6%, less than 0.5%, or less than 0.4% by weight of Mn. The formulation may comprise at least 0.3% to about 1.0%, about 0.4% to about 1.0%, about 0.4% to about 0.9%, or about 0.4% to about 0.8% by weight of Mn. In some embodiments, the formulations comprise about 0.4% to about 0.8% by weight of Mn, such as about 0.4%, about 0.5%, about 0.6%, about 0.7%, or about 0.8% by weight of Mn.

The Mn may be included in the formulations at least partially in the form of a manganese oxide, such as MnO. For example, the formulations may include at least 0.39% by weight of MnO, corresponding to at least 0.30% by weight of Mn. In some embodiment, the formulations comprise at least 0.40% to about 1.30%, about 0.50% to about 1.30%, about 0.50% to about 1.20%, about 0.50% to about 1.10%, or about 0.50% to about 1.00% by weight of MnO. In some embodiments, the formulations comprise about 0.50% to about 1.00% by weight of MnO, such as about 1.00%, about 0.90%, about 0.80%, about 0.70%, about 0.60%, or about 0.50% by weight of MnO.

In some embodiments, the combined amount of Mn (x) and Co (y) in the formulation satisfies $z=1.29x+1.36y$, wherein x is at least 0.31%, y is 0.00%-0.50%, and z is about 0.75% to about 1.25%. The value of z may be about 0.80%, about 0.90%, about 1.00%, about 1.10%, or about 1.20%.

The formulations may comprise at least 1.0% by weight of antimony (Sb), such as at least 1.25%, at least 1.50%, at least 1.75%, at least 2.00%, at least 2.25%, at least 2.50%, or at least 2.75% by weight of Sb. The formulations may comprise less than 3.00%, less than 2.75%, less than 2.50%, less than 2.25%, less than 2.00, less than 1.75, less than 1.50%, or less than 1.25% by weight of Sb. The formulations may comprise at least 1.00% to about 3.00%, at least 1.00% to about 2.50%, about 1.25% to about 2.50%, or about 1.50% to about 2.50% by weight of Sb. In some embodiments, the formulations comprise about 1.50% to about 2.50% by weight of Sb, such as about 1.70%, about 1.80%, about 1.90%, about 2.00%, about 2.10%, or about 2.20% by weight of Sb.

The Sb may be included in the formulations at least partially in the form of an antimony oxide, such as $Sb_2O_3$. For example, the formulations may comprise at least 1.20% by weight of $Sb_2O_3$, corresponding to at least 1.00% by weight of Sb. In some embodiments, the formulations comprise at least 1.20% to about 3.60%, about 1.50% to about 3.60%, about 1.80% to about 3.60%, about 1.80% to about 3.40%, about 1.80% to about 3.20%, or about 1.80% to about 3.00% by weight of $Sb_2O_3$. In some embodiments, the formulations comprise about 1.80% to about 3.00% by weight of $Sb_2O_3$, such as about 2.00%, about 2.25%, about 2.50%, or about 2.75% by weight of $Sb_2O_3$.

The formulations may comprise at least 0.4% by weight of bismuth (Bi), such as at least 0.50%, at least 0.60%, at least 0.70%, at least 0.80%, at least 0.90%, at least 1.00%, at least 1.10%, at least 1.20%, at least 1.30%, at least 1.40%, at least 1.50%, at least 1.60%, at least 1.70%, at least 1.80%, or at least 1.90% by weight of Bi. The formulations may comprise less than 2.00%, less than 1.90%, less than 1.80%, less than 1.70%, less than 1.60%, less than 1.50%, less than 1.40%, less than 1.30%, less than 1.20%, less than 1.10%, less than 1.00%, less than 0.90%, less than 0.80%, less than 0.70%, less than 0.60%, or less than 0.50% by weight of Bi. The formulations may comprise at least 0.40% to about 2.0%, about 0.50% to about 2.00%, about 0.50% to about 1.80%, about 0.50% to about 1.50%, about 0.50% to about 1.20%, or about 0.50% to about 1.00% by weight of Bi. In some embodiments, the formulations comprise about 0.50% to about 1.00% by weight of Bi, such as about 0.60%, about 0.70%, about 0.80%, about 0.90%, or about 1.00% by weight of Bi.

The Bi may be included in the formulations at least partially in the form of a bismuth oxide, such as $Bi_2O_3$. For example, the formulations may include at least 0.44% by weight of $Bi_2O_3$, corresponding to at least 0.40% by weight of Sb. In some embodiment, the formulations comprise at least 0.44% to about 2.20%, about 0.50% to about 2.20%, about 0.60% to about 2.00%, about 0.60% to about 1.50%, or about 0.60% to about 1.20% by weight of $Bi_2O_3$. In some embodiments, the formulations comprise about 0.60% to about 1.20% by weight of $Bi_2O_3$, such as about 0.70%, about 0.80%, about 0.90%, about 1.00%, about 1.10%, or about 1.20% by weight of $Bi_2O_3$.

The formulations may include Sb and Bi at a molar ratio of Sb:Bi=2:1 or greater. The Sb to Bi molar ratio may be, for example, at least 2.5:1, at least 3.0:1, at least 4.0:1, at least 5.0:1, at least 6.0:1, or at least 7.0:1. In some embodiments, the Sb:Bi molar ratio is about 2.5:1 to about 5.0:1, such as about 3.0:1, about 4.0:1, about 4.5:1, or about 4.8:1.

In a first embodiment, the formulation comprises, by weight of the formulation, 91.0% to about 97.0% ZnO, at least 0.30% to about 1.00% Mn, about 1.00% to about 3.00% Sb, about 0.40% to about 2.00% Bi, and 0.50% or less Co. For example, such formulation may comprise, by weight, at least 0.39% to about 1.29% MnO (corresponding to at least 0.30% to about 1.00% Mn), about 1.20% to about 3.59% $Sb_2O_3$ (corresponding to about 1.00% to about 3.00% Sb), about 0.44% to about 2.23% $Bi_2O_3$ (corresponding to about 0.40% to about 2.00% Bi), and about 0.68% or less $Co_3O_4$ (corresponding to 0.50% or less Co).

In a second embodiment, the formulation comprises, by weight of the formulation, 91.0% to about 97.0% ZnO, about 1.50% to about 2.50% Sb, about 0.50% to about 1.00% Bi, about 0.40% to about 0.80% Mn, and 0.50% or less Co. For example, the formulation may include, by weight, about 1.80% to about 2.99% $Sb_2O_3$ (corresponding to about 1.50% to about 2.50% Sb), about 0.56% to about 1.11% $Bi_2O_3$ (corresponding to about 0.50% to about 1.00% Bi), about 0.52% to about 1.03% MnO (corresponding to about 0.40% to about 0.80% Mn) and about 0.68% or less $Co_3O_4$ (corresponding to 0.50% or less Co).

In the first and second embodiments, the total amount of Mn and Co may be in a range of about 0.70% to about 1.00% by weight of the formulation. For example, the formulation may comprise Mn in the form of MnO and Co in the form of $Co_3O_4$, and the combined amount of MnO and $Co_3O_4$ is about 0.75% to about 1.25% by weight of the formulation.

In the first and second embodiments, the amount of Co may be reduced to 0.20% or less. For example, the formulation may comprise 0.27% or less $Co_3O_4$ (corresponding to 0.20% or less Co). In the first and second embodiments, the Sb to Bi molar ratio may be 2:1 or greater, such as 4:1 or greater.

In a third embodiment, the formulation comprises, by weight of the formulation, 91.0% to about 97.0% ZnO, about 0.50% to about 1.00% MnO, about 1.75% to about 2.25% $Sb_2O_3$, about 0.50% to about 1.00% $Bi_2O_3$, and 0.2% or less $Co_3O_4$. In the third embodiment, the total amount of Mn and Co may be about 0.50% to about 1.00% by weight of the formulation, and the molar ratio of Sb to Bi may be 4:1 or greater.

The formulations described herein may further include one or more additives know in the art, such as Ag, Al, B, Cr, K, Ni, Si, Sn, or a combination thereof. The additives in the MOV formulations may facilitate processing, sintering, and/or microstructure development of the ceramic. The additives may be included in the formulations in various molecular forms, such as oxides, carbonates, hydroxides, or nitrates. Suitable oxides for the additives include, for example, AgO, $Ag_2O$, $Al_2O_3$, $B_2O_3$, $Cr_2O_3$, $K_2O$, NiO, $SiO_2$, and $SnO_2$. In some embodiments, the formulations may preferably include B and/or K to facilitate liquid phase formation, and may further include other dopants or sintering aids. In some embodiments, the formulations may include Al and/or other dopant species (e.g., 5-20 ppm) to provide conductivity within the ZnO grains.

Any other additives present in the formulation may comprise about 0.001% to 0.500% or more by weight. For example, the formulations may include one or more additives selected from AgO, $Ag_2O$, $Al_2O_3$, $B_2O_3$, $Cr_2O_3$, $K_2O$, NiO, $SiO_2$, and $SnO_2$, each of which, if present, is at about 0.005%, about 0.010%, about 0.020%, about 0.030%, about 0.040%, or about 0.045% by weight. In some embodiments, the formulations include one or more additives selected from $Ag_2O$, $Al_2O_3$, $B_2O_3$, and $K_2O$, each of which, if present, is at about 0.020%, about 0.025%, or about 0.030% by weight. In some embodiments, the formulations include $Ag_2O$, $Al_2O_3$, $B_2O_3$, and $K_2O$, each of which is present at about 0.020%, about 0.025%, or about 0.030% by weight.

In some embodiments, each of the first electrode surface and the second electrode surface has an area of at least 4 $cm^2$. The surface area may be about 5.0 $cm^2$, about 8 $cm^2$, about 10 $cm^2$, or about 15 $cm^2$. In some embodiments, a distance between the first and the second electrode surfaces is at least 15 mm. For example, the distance may be the distance between two metal plates functioning as the electrodes of the varistor. The distance between the first and the second electrode surfaces may be about 16 mm, about 18 mm, about 20 mm, about 22 mm, or about 25 mm. The surface area and distance may be adjusted for particular uses. In some embodiments, each of the first electrode surface and the second electrode surface has an area of at least 4 $cm^2$ and the distance between the first and the second electrode surfaces is at least 15 mm.

In some embodiments, the metal oxide varistor as described herein has a maximum continuous operating voltage (MCOV) of at least 3.0 kV RMS, such as at least 4.0 kV, at least 4.5 kV, at least 5.0 kV, at least 5.5 kV, at least 6.0 kV, or at least 6.5 kV RMS. For example, the MCOV may be about 4.8 kV, about 5.0 kV, about 5.2 kV, about 5.4 kV, about 5.6 kV, about 5.8 kV, or about 6.0 kV.

In some embodiments, the metal oxide varistor as described herein has a 60 Hz power dissipation of less than 0.1 W/kV of maximum continuous operating voltage (MCOV) at 100° C. or less than 0.2 W/kV of maximum continuous operating voltage (MCOV) at 150° C. The 60 Hz power dissipation may be less than 0.07 W/kV, less than 0.05 W/kV, or less than 0.02 W/kV of MCOV at 100° C. The 60 Hz power dissipation may be less than 0.18 W/kV, less than 0.15 W/kV, less than 0.12 W/kV, or less than 0.10 W/kV of MCOV at 150° C.

In some embodiments, the ratio of the power dissipation at 150° C. to the power dissipation at 20° C. of the present metal oxide varistors, both measured at 60 Hz at MCOV, is less than 20. For example, the ratio of the 150° C. power dissipation to the 20° C. power dissipation may be less than 15, less than 10, less than 5, or less than 2.

The MOV formulations as described herein may be manufactured by methods known in the art. A typical manufacture process may include pre-reaction of the ingredients via a mixing or grinding process, calcination, re-mixing with zinc oxide, and spray drying to form a powder. The powder may be then pressed into the desired shape and heat treated at up to 1150° C. in one or more stages. During this time, any organic binders are removed and the material sinters to form a dense ceramic. Typical post-processing operations include grinding and metallization of the electrode faces, application of an electrically insulating glaze, and additional heat treatment steps.

The MOVs produced with the formulations as describe herein have performance advantages relative to existing commercial MOV devices. In particular, the present formulations and MOVs exhibit reduced power dissipation in the range of 1.0-1.25*MCOV at elevated temperatures (e.g., 100-180° C.). A reduced risk of thermal runaway may allow surge arresters to use less volume of MOV to meet functionally equivalent design specifications. When Co is replaced by Mn in the MOV formulation, the power dissipation at V=1.2-1.25*MCOV and T 100° C. is improved relative to similar formulations containing both Mn and Co. The degree of improvement increases with increasing Mn/(Mn+Co) from 0.5 to 1.0. Increasing Mn/(Mn+Co) reduces the nonlinearity coefficient (a) at higher current densities, and the formulation may be adjusted for specific application conditions. The formulation may also be adjusted to optimize other properties of interest, such as stability of the electrical properties with respect to time under AC excitation or with respect to impulse duty.

As a result of improved thermal recovery, the MOVs as described herein typically meet or exceed the performance of conventional MOVs used for high voltage surge arresters. In arrester designs that are limited by thermal performance, the present disclosure may allow reduction of the volume of MOV by 10% or more. This reduction in volume may be accomplished, for example, by reducing the cross-sectional area of the MOV block or by increasing the voltage gradient $V_{res}$/mm, where $V_{res}$ represents the residual voltage of the MOV for a given impulse wave.

The impulse conditions for measuring $V_{res}$ of the MOV are herein defined as a nominal 8×20 μs waveform as 5 kA peak for MOVs used in IEEE "normal duty" or IEC "distribution medium" arresters, and 8×20 μs at 10 kA peak for MOVs used in IEEE "heavy duty" or IEC "distribution high" arresters and for MOVs used in station class arresters. The present MOVs for distribution arresters are preferably manufactured with $V_{res}$/mm between 420-625 and most preferably between 450-525. For station class MOVs, $V_{res}$/mm is preferably 325-525. Adjustment of voltage gradient may be achieved, for example, by adjusting the sintering temperature or the MOV formulation.

In addition to improved thermal stability and reduced nonlinearity, the MOVs as described herein may be produced at significantly lower cost than existing commercial MOVs due to a reduction in the use of expensive raw materials. In particular, the reduction or elimination of Co from the MOV formulation is of strategic importance due to price volatility and high demand pressure for other commercial applications such as lithium battery manufacture. The level of Co used may be adjusted to meet the specific needs of a surge arrester design. Formulations entirely without cobalt may meet or exceed typical performance of known high voltage MOV devices.

In another aspect, the present disclosure provides a surge arrester for protecting one or more conductors against a power surge, the surge arrestor comprising a metal oxide varistor as described herein, wherein a surge current travels from a conductor to ground through the metal oxide varistor. Surge arresters may be constructed using one or more metal oxide varistors according to known methods.

In some embodiments, the surge arresters described herein are designed for high voltage applications covered by applicable domestic or international standards such as IEEE C62.11, IEC 60099-4, or other national standards derived therefrom, and which is rated for a 4×10 μs surge current of about 65 kA or higher.

EXAMPLES

Example 1

Example formulations (A, B, and C) with different amounts of Mn and Co were prepared according to Table 1. The properties of these formulations are shown in Table 2. The "REF" material is a commercially available MOV used in IEEE C62.12 "normal duty" surge arresters. The value of nonlinearity coefficient (a) is calculated between 3 mA and 5 kA for all MOVs, which are nearly the same in physical dimension. Each of the values of a represents an average between 3 mA to 5 kA. All three formulations show values of a that are comparable to or better than the commercial material. Notably, the value of α decreases as Co is replaced with Mn.

TABLE 1

MOV Formulations A-C (values in wt %)

| | MnO | $Co_3O_4$ | $Sb_2O_3$ | $Bi_2O_3$ | $B_2O_3$ | $K_2O$ | $Ag_2O$ | $Al_2O_3$ | ZnO |
|---|---|---|---|---|---|---|---|---|---|
| A | 0.97% | 0% | 2.39% | 0.82% | 0.024% | 0.025% | 0.018% | 0.0015% | 95.8% |
| B | 0.90% | 0.09% | 2.41% | 0.82% | 0.024% | 0.025% | 0.018% | 0.0015% | 95.7% |
| C | 0.54% | 0.54% | 2.51% | 0.86% | 0.025% | 0.026% | 0.019% | 0.0023% | 95.5% |

TABLE 2

Dimensions and properties of MOV formulations

| | Diameter (mm) | Height (mm) | MCOV kV | $V_{ref}$kV @3 mA | $V_{res}$ kV @5 kA | $V_{res}$/ mm | α |
|---|---|---|---|---|---|---|---|
| A | 27.9 | 21.0 | 5.89 | 7.47 | 12.42 | 591 | 28.2 |
| B | 27.8 | 21.0 | 5.38 | 6.82 | 10.97 | 522 | 30.1 |
| C | 28.0 | 21.0 | 4.97 | 6.3 | 9.27 | 441 | 37.1 |
| REF | 28.8 | 20.9 | 3.87 | 4.91 | 8.08 | 387 | 28.8 |

Power dissipation at MCOV (shown as RMS watts per kV of MCOV) was measured for the three example formulations and the commercial MOV ("REF"), as shown in FIG.

1. Formulations A, B, and C demonstrated approximately one order of magnitude improvement in power dissipation at MCOV over the commercial MOV. These formulations also demonstrated a reduced temperature dependence of power dissipation. Formulations A (0% $Co_3O_4$) and B (0.09% $Co_3O_4$) showed additional reduction in power dissipation in the temperature range of approximately 75-180° C. as compared to Formulation C (0.54% $Co_3O_4$), which is attributed to the replacement of Co with Mn in these formulations.

Additional MOV formulations were prepared and tested. Table 3 shows the weight percent of the elements calculated from the corresponding oxides included in the formulation. Formulations B, D, and G showed overall best performance under the tested conditions.

TABLE 3

MOV Formulations D-G (values in wt %)

| Element | Formulation | | | |
|---|---|---|---|---|
| | D | E | F | G |
| B | 0.008% | 0.009% | 0.009% | 0.008% |
| Ag | 0.019% | 0.019% | 0.018% | 0.019% |
| Sn | 0.000% | 0.000% | 0.000% | 0.000% |
| Mn | 0.655% | 0.655% | 0.651% | 0.656% |
| Co | 0.000% | 0.000% | 0.000% | 0.000% |
| Ni | 0.000% | 0.000% | 0.000% | 0.000% |
| Sb | 2.003% | 1.451% | 1.918% | 1.823% |
| Bi | 0.673% | 1.245% | 1.634% | 0.613% |
| Al | 0.0007% | 0.0008% | 0.0008% | 0.0008% |
| K | 0.016% | 0.026% | 0.026% | 0.016% |
| Zn | 76.790% | 76.853% | 76.012% | 77.033% |

Various features and advantages of the application are set forth in the following claims.

What is claimed is:

1. A metal oxide varistor comprising:
a sintered ceramic comprising, by weight:
about 91.0% to about 97.0% ZnO;
at least 0.3% Mn;
at least 0.4% Bi;
at least 1.0% Sb; and
0.5% or less Co.

2. The metal oxide varistor of claim 1, wherein the ceramic comprises 0.3% or less Co by weight of the formulation.

3. The metal oxide varistor of claim 1, wherein the ceramic comprises 0.2% or less Co by weight of the formulation.

4. The metal oxide varistor of claim 1, wherein the ceramic comprises 0.1% or less Co by weight of the formulation.

5. The metal oxide varistor of claim 1, wherein the ceramic is free of Co.

6. The metal oxide varistor of claim 1, wherein the ceramic comprises, by weight:
at least 0.3% to about 1.0% Mn;
at least 0.4% to about 2.0% Bi; and
at least 1.0% to about 3.0% Sb.

7. The metal oxide varistor of claim 6, wherein ceramic comprises, by weight:
about 0.4 to about 0.8% Mn;
about 0.5% to about 1.0% Bi; and
about 1.5% to about 2.5% Sb.

8. The metal oxide varistor of claim 6, wherein the combined amount of MnO and $Co_3O_4$ is about 0.75% to about 1.25% by weight.

9. The metal oxide varistor of claim 6, wherein a molar ratio of Sb to Bi is 2:1 or greater.

10. The metal oxide varistor of claim 6, wherein a molar ratio of Sb to Bi is 4:1 or greater.

11. The metal oxide varistor of claim 1, wherein the ceramic further comprises an additive comprising Ag, Al, B, Cr, K, Ni, Si, Sn, or a combination thereof.

12. The metal oxide varistor claim 1, further comprising a first electrode having a first electrode surface and a second electrode having a second electrode surface, wherein each of the first electrode surface and the second electrode surface has an area of at least 4 $cm^2$, and wherein a distance between the first and the second electrode surfaces is at least 15 mm.

13. The metal oxide varistor of claim 1, wherein the metal oxide varistor has a maximum continuous operating voltage (MCOV) of at least 3.0 kV RMS.

14. The metal oxide varistor of claim 13, wherein the maximum continuous operating voltage (MCOV) is at least 4.5 kV RMS.

15. The metal oxide varistor of claim 1, wherein the metal oxide varistor has a 60 Hz power dissipation of less than 0.1 W/kV of maximum continuous operating voltage (MCOV) at 100° C. or less than 0.2 W/kV of maximum continuous operating voltage (MCOV) at 150° C.

16. The metal oxide varistor of claim 1, wherein the ratio of the 150° C. power dissipation to the 20° C. power dissipation, both measured at 60 Hz at MCOV, is less than 20.

17. A surge arrester for protecting one or more conductors against a power surge, the surge arrester comprising the metal oxide varistor of claim 1, wherein a surge current travels from a conductor to ground through the metal oxide varistor.

18. The surge arrester of claim 17 designed for high voltage applications covered by IEEE C62.11 or IEC 60099-4, and which is rated for a 4×10 µs surge current of about 65 kA or higher.

* * * * *